United States Patent [19]
Hirano et al.

[11] Patent Number: 5,309,436
[45] Date of Patent: May 3, 1994

[54] MULTIPLEX TRANSMISSION SYSTEM FOR VEHICLES

[75] Inventors: Seiyo Hirano; Kunihiko Matumura; Satoru Kawasoe, all of Hiroshima, Japan

[73] Assignee: Mazda Motor Corporation, Hiroshima, Japan

[21] Appl. No.: 836,419

[22] Filed: Feb. 18, 1992

[30] Foreign Application Priority Data

Feb. 18, 1991 [JP] Japan .................. 3-022572

[51] Int. Cl.[5] .................. H04J 3/02; H04Q 11/04
[52] U.S. Cl. .................. 370/85.1; 370/85.6; 340/825.5; 307/10.1
[58] Field of Search .................. 370/13, 14, 85.1, 85.2, 370/85.3, 85.6, 85.13, 94.3, 85.8, 95.2; 340/825.06, 825.5, 825.51, 825.08; 307/10.1, 38, 39, 40

[56] References Cited

U.S. PATENT DOCUMENTS

| | | | |
|---|---|---|---|
| 4,584,487 | 4/1986 | Hesse et al. | 370/85.6 |
| 4,669,079 | 5/1987 | Blum | 340/825.5 |
| 4,715,031 | 12/1987 | Crawford et al. | 370/85.6 |
| 4,727,539 | 2/1988 | Arita et al. | 370/85.6 |
| 4,745,596 | 5/1988 | Sato | 370/85.6 |
| 4,914,654 | 4/1990 | Matsuda et al. | 370/85.1 |
| 4,964,076 | 10/1990 | Schurk | 340/825.5 |

*Primary Examiner*—Benedict V. Safourek
*Assistant Examiner*—Alpus H. Hsu
*Attorney, Agent, or Firm*—Fish & Richardson

[57] ABSTRACT

A multiplex transmission system for vehicles having a plurality of multiplex nodes connected to a transmission path in order to communicate information therebetween for controlling a vehicle. Each of the multiplex nodes a priority code which indicates a priority of the signals to be transmitted with the data when a plurality of multiplex nodes concurrently transmit data and accordingly the signals therefrom collide with each other. The priority data includes a first priority which attaches importance to high responsiveness for the engine and a second priority which attaches importance to safety. A detector is provided for detecting the traffic condition in the multiplex transmission path. A priority changer is provided for changing the priority respectively in accordance with the traffic condition, so that proper control of both response and safety can be reconciled.

18 Claims, 8 Drawing Sheets

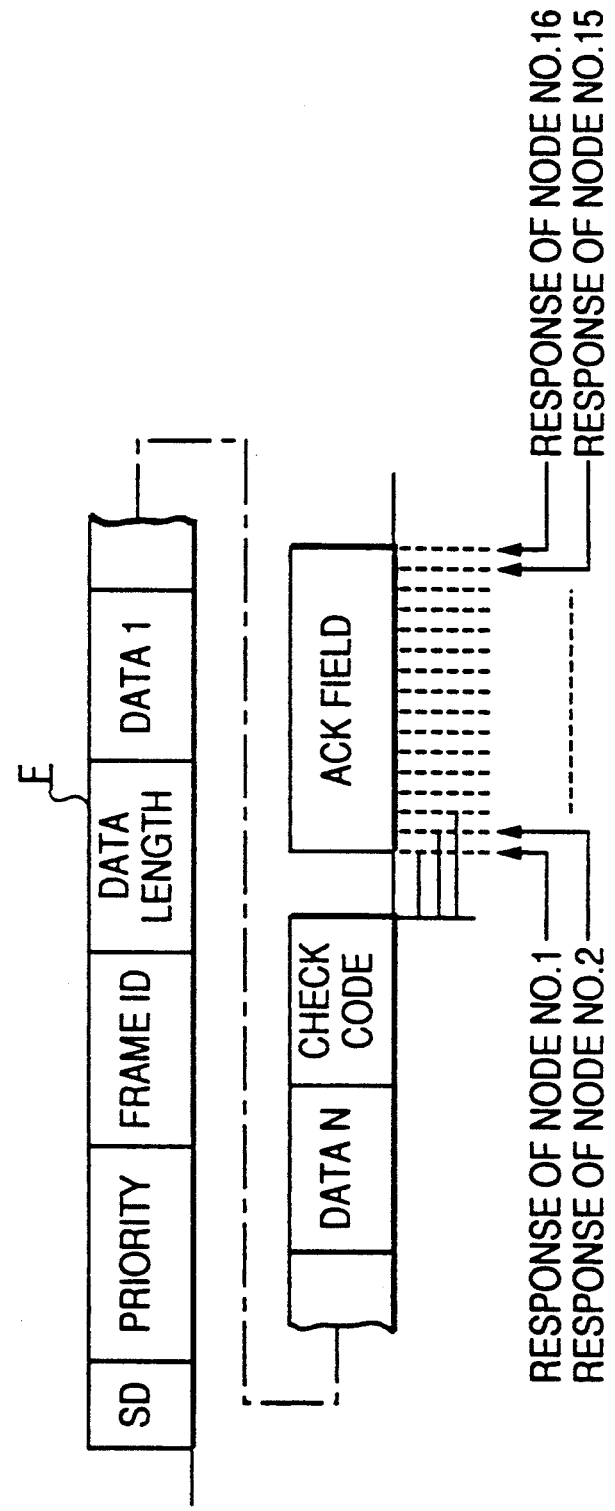

FIG. 3(a)

(TYPE I) 21

| MULTIPLEX SIGNAL | PRIORITY |
|---|---|
| SIGNAL a | 001 |
| SIGNAL b | 010 |
| SIGNAL c | 011 |
| SIGNAL d | 100 |
| SIGNAL e | 101 |
| --- | --- |

FIG. 3(b)

(TYPE II) 22

| MULTIPLEX SIGNAL | PRIORITY |
|---|---|
| SIGNAL a | 101 |
| SIGNAL b | 011 |
| SIGNAL c | 100 |
| SIGNAL d | 001 |
| SIGNAL e | 010 |
| --- | --- |

FIG. 4(a)

(TYPE I) 31

| MULTIPLEX SIGNAL | PRIORITY |
|---|---|
| SIGNAL a | 001 |
| SIGNAL b | 010 |
| --- | --- |

FIG. 4(b)

(TYPE II) 32

| MULTIPLEX SIGNAL | PRIORITY |
|---|---|
| SIGNAL a | 101 |
| SIGNAL b | 011 |
| --- | --- |

(TMS NODE)

FIG. 6(a)
(TYPE I)

| RANK / RESPONSE | HIGH | MEDIUM | LOW |
|---|---|---|---|
| HIGH | 1 | 2 | 3 |
| MEDIUM | 4 | 5 | 6 |
| LOW | 7 | 8 | 9 |

FIG. 6(b)
(TYPE II)

| RANK / RESPONSE | HIGH | MEDIUM | LOW |
|---|---|---|---|
| HIGH | 1 | 4 | 7 |
| MEDIUM | 2 | 5 | 8 |
| LOW | 3 | 6 | 9 |

MULTIPLEX TRANSMISSION SYSTEM FOR VEHICLES

BACKGROUND OF THE INVENTION

The present invention relates to a multiplex transmission system for a vehicle. Particularly, to a system in which a priority code, which is a code for priority control, is changeable in accordance with a traffic condition of the multiplex transmission path.

The greater use of electronics in vehicles has been accompanied by a number of serious problems, among which are the enlargement in size and the complexity of wire harnesses that interconnect the electronic components. Multiplex communication has become a means for solving these problems, particularly in the automotive field. Multiplex communication refers to transmission, by time-division multiplexing, and basically employs serial transmission.

For example, an EGI multiplex control node for an engine control system, a 4WS multiplex control node for a four wheel steering system, and an ABS multiplex control node for an anti-lock braking system are connected to the multiplex transmission path.

In this multiplex transmission system for vehicles, information for the vehicle, for example, operating information and driving information, are transmitted in units of a frame F each having the frame format as shown in FIG. 2. This frame F consists of an SD (Start Delimiter), a priority code, a frame ID code, data length, data 1 to N, and a check code.

First, the "SD code" is a special code indicating the beginning of the frame F. The reception-side multiplex control node recognizes the start of the frame F upon receiving the SD code.

The "priority code" is a code for indicating the priority of the frame F to be transmitted as a transmission on the multiplex transmission path. If a plurality of multiplex control nodes send the respective frames to the multiplex transmission path at the same time, (i.e., collision of signals happens), each multiplex control node judges whether it should keep sending its frame or not, by comparing its priority to another frame's priority. The multiplex control node sending the frame with a lower priority stops sending its frame at the time of judging its order of priority. Meanwhile, the multiplex control node sending its frame with a higher priority keeps sending its frame, so that this frame with a higher priority is transmitted as a transmission on the multiplex transmission path.

The "frame ID code" is a code for indicating the kind of data which is to be assigned to each bit of a data area. In other words, it indicates the control node in which the frame is used.

The "data length" of FIG. 2, is the number of data which are written in that frame. When there are N number/numbers of data, "N" is sent as a data length. A multiplex control node that receives this frame reads out as much data as corresponds to the data length and a field that follows the data is a CRC check code (error detection code). By confirming this code, it can be confirmed that the end of the frame has been reached.

An explanation will now be given of the reception confirmation signal area (ACK field) of FIG. 2. This field is made up of a plurality of bits, for instance, 16 bits. A predefined bit area has been assigned to each of the multiplex control nodes. The control nodes on the transmission side check whether a reception has been made normally on the reception side based on each bit of this ACK field. The procedure for using the ACK field will now be explained in more detail. It is assumed that in the ACK field of FIG. 2, control nodes A, B, and C are assigned to bits 1, 2, and 3, respectively. A certain control node on the transmission side sets the bit of the 16-bit ACK field at a position corresponding to the control node itself to "0" and sets the other bits to "1". That is, the control node transmits one "0" bit and fifteen "1" bits following the transmission frame with a predetermined gap to the transmission path. The multiplex control nodes on the reception side check whether or not the contents of the received frame are correct using a check code. If the multiplex control nodes have found no errors, each of the control nodes transmits the corresponding ACK bit which is set to "0" as a reception confirmation signal. As a result of the above procedure, a control node whose ACK bit is "0" indicates that the control node has properly received the frame.

The control of the transmission of the ACK bit is not directly related to the present invention, but it is explained in detail in U.S. patent application Ser. No. 426,399 (filed on Oct. 25, 1989). U.S. patent application Ser. No. 426,399 is incorporated into the present application by reference.

The priority code can be determined by various policies. For example, in the present technology for an automotive vehicle, response to transmitting vehicle information is employed. The EGI control node receives information from each of the sensors frequently, and transmits corresponding information to the other control nodes immediately. The EGI control node has a high priority. On the other hand, 4WS control node and ABS control node which carry out control related to safety, do not have such a high response priority as is in the case of the EGI control node, since their information is not changed as often. Therefore, in the present technology as mentioned above, higher priority to EGI control node and lower priority to 4WS control node and ABS control node are given by a policy to attach importance to their responses. This priority is fixed and can not be changed.

The multiplex transmission system explained above has the following disadvantage.

When a vehicle runs on a winding road, signals from the 4WS control node are transmitted more frequently than in the case of a straight road. As a result, traffic on the transmission path increases and the transmission of the information from 4WS control node, which has a lower priority than that of the EGI control node, is delayed. Furthermore, when the braking control is operated, a signal from the ABS control node is transmitted more frequently. As a result, traffic on the transmission path increases, and the transmission of the information from ABS control node, which has a lower priority than that of the EGI control node, is delayed.

However, control of the 4WS control node and the ABS control node is important to maintain safety of a vehicle. In this regard, it is required to transmit the information from the 4WS control node and the ABS control node as soon as possible, even when the traffic on the transmission path is crowded. On the other hand, fixing a lower priority for the EGI control node than the 4WS control node, results in a disadvantage of losing responsiveness from the engine control.

SUMMARY OF THE INVENTION

An object of the present invention is to provide a multiplex transmission system which overcomes the above mentioned disadvantage of the present technology and permits high response and safety.

Another object of the present invention is to provide a multiplex transmission system which can permit a high response and address safety considerations without making any change in hardware.

The present invention relates to a multiplex transmission system for a vehicle comprising a multiplex transmission path, a plurality of multiplex nodes, the multiplex nodes being connected to the multiplex transmission path. The multiplex nodes are capable of sending and receiving respective signals containing information to and from the multiplex transmission path. The multiplex nodes include means for determining the order of priority of the signals in a predetermined manner such that a signal with higher priority is sent prior to a signal with lower priority when the multiplex nodes are sending respective signals at the same time. The system also includes detecting means for detecting a traffic condition on the multiplex transmission path and priority changing means for changing the predetermined manner used for determining the order of priority of signals by the multiplex nodes in response to the traffic condition detected by the detecting means.

According to a feature of the present invention, a detecting means detects the traffic value (amount of frames) on the multiplex transmission path.

According to another feature of the present invention, the traffic value is determined by counting a total time of frames, which are units of the transmission information, existing on the transmission path for a predetermined time period.

According to another feature of the present invention, a traffic value is determined by counting a number of particular code in a predetermined time period included in a frame. According to this embodiment of the present invention, the particular code is the SD code indicating the beginning of the frame.

According to the present invention, a priority changing means changes the priority when the detected traffic value is greater than a predetermined value.

According to another feature of the present invention, the control nodes include an EGI control node for controlling the engine system, a 4WS control node for controlling rear wheel steering system and a ABS control node for controlling the anti-lock braking system.

Other objects and advantages besides those discussed above shall be apparent to those skilled in the art from the following description of a preferred embodiment of the invention. In the description, reference is made to accompanying drawings, which form a part thereof, and which illustrate examples of the invention. Such examples, however are not exhaustive of the various embodiments of the invention, and therefore reference is made to the following claims as the description for determining the scope of the invention.

BRIEF DESCRIPTION OF THE DRAWINGS

FIG. 2 is a view for explaining the format of a frame which flows through a transmission path;

FIGS. 3(a) and 3(b) and 4(a) and 4(b) are views of the priority tables for each control node;

FIGS. 6(a) and 6(b) are views showing the concept for determining the priority of each control node;

DETAILED DESCRIPTION OF THE PREFERRED EMBODIMENTS

Figure 1:
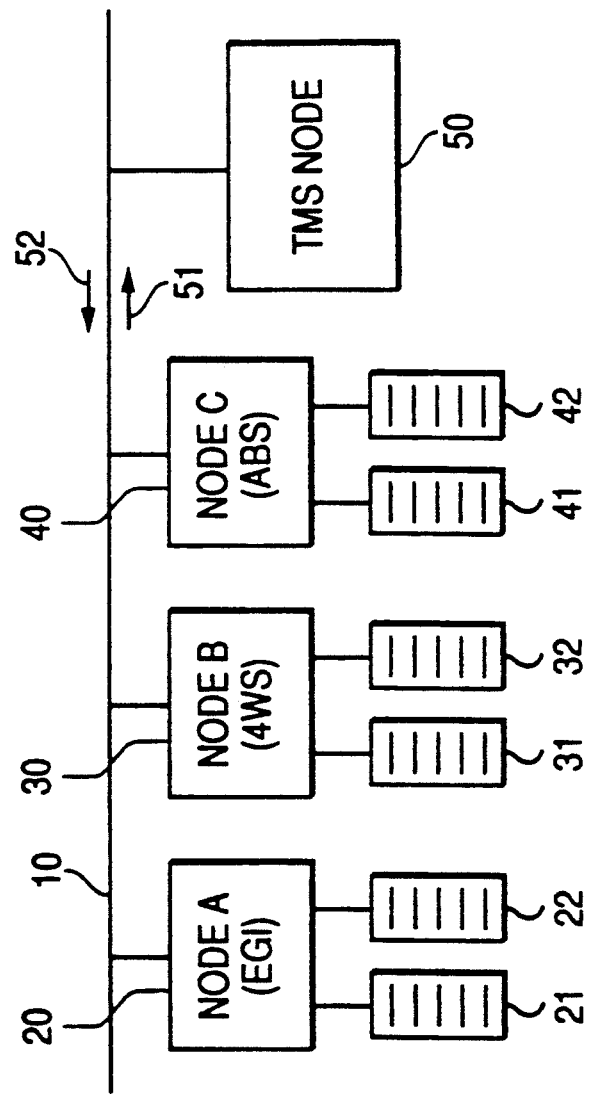
FIG. 1 is a view of the entire arrangement of a system according to a first embodiment of the invention.

FIG. 1 shows an overall schematic construction of the multiplex transmission apparatus for vehicles according to a first embodiment. Numeral 10 denotes a multiplex transmission path composed of twisted pair lines, which is in the form of loop. A plurality of control nodes are connected to the transmission path. Control node A (reference numeral 20) is the EGI control node for controlling the engine system, control node B (reference numeral 30) is the 4WS control node for controlling the rear wheel steering system, and control node C (reference numeral 40) is the ABS control node for controlling the anti-lock braking system. Each control node has two types of priority tables. One of the tables is set to attach importance to high response (expressed as Type I below), as shown in the Tables 21, 31, and 41, and which are stored in the respective memories. The other table is set to attach importance to safety (expressed as Type II below), as shown in Tables 22, 32, and 42, which are stored in the respective memories.

Control nodes 20, 30, and 40 detect the collision between signals when other control nodes transmit respective frames at a same time, and recognize whose priority is higher than the other, in accordance with Table (a) or Table (b). A TMS (Total Messaging System) node 50 is for detecting the traffic value on the transmission path and gives a priority changing signal to each node 20, 30, and 40 for changing the respective priority tables relating to the traffic value of each of the control nodes. The TMS node essentially is provided for a failure diagnosis function of this multiplex transmission path, therefore, the above mentioned function of the TMS is performed by adding a slight change in software, and does not require an additional change in hardware.

FIGS. 3a and 3b show a priority table 21 (type I) and priority table 22 (type II), for a control node A 20, and FIGS. 4a and 4b show priority table 31 (type I) and priority table 32 (type II) for a control node B 30 in detail. The priority table for a control node C is not shown. In FIGS. 3 and 4, the transmission signal of control node A is denoted as signal a, control node B is denoted as signal b, control node C is denoted as signal c, and other signals d, e, and so on are denoted as well. Priority code shows a high priority if its value is small. In FIG. 3(a), the priority of the signal of a control node A, which relates to high response, is set higher than that of signal b of node B and signal c of control node C. On the other hand, in FIG. 3(b) the priority of the signal b of control node B and signal c of control node C, which are related to safety, are set higher than that of signal a of control node A. In other words, Type I is set for high response for the engine and Type II is set for safety respectively. The priority code of control node B and C are set in the same manner as control node A.

The priority control by the above mentioned TMS node and each control node will be explained on the basis of the control procedure of FIG. 5.

Figure 5A:
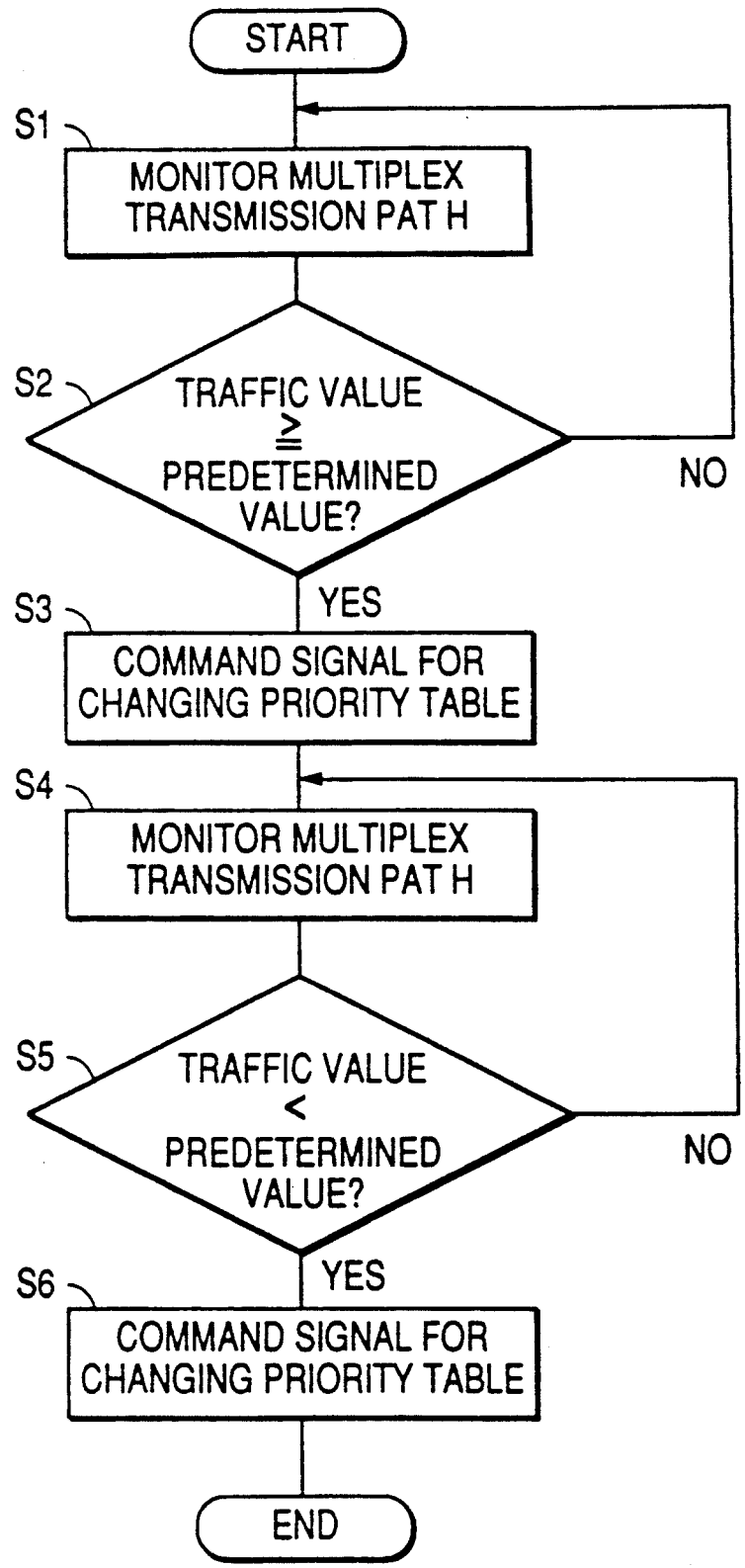
FIGS. 5(a) and 5(b) are flowcharts illustrating the control procedure of a TMS node and each control node in the first embodiment.
Figure 5B:
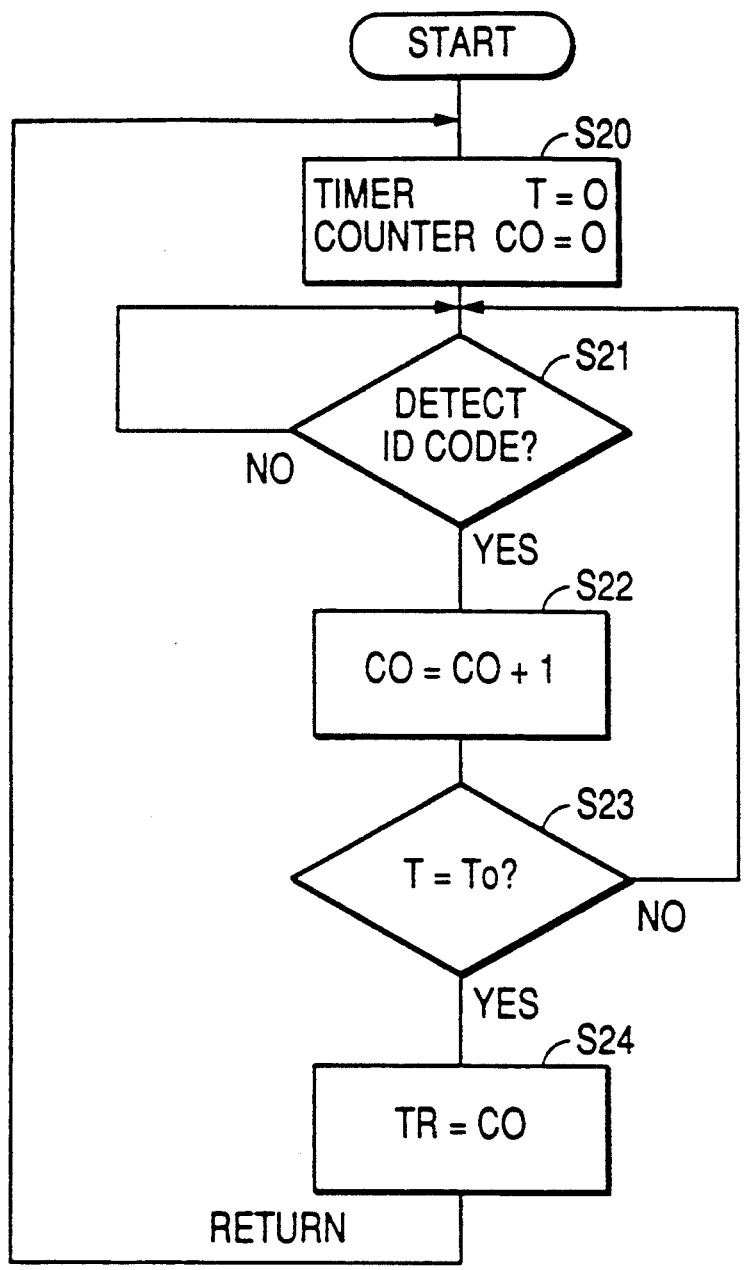

FIG. 5(a) shows the control procedure which is utilized for changing the priority in each of the control nodes. In an initial condition, each control node selects priority from tables 21, 31, and 41. In step S1, the TMS node monitors the traffic value TR on the transmission path, and determines whether this value TR is greater than predetermined value TRO or not in step 2. If TR is smaller than TRO, TMS node continues monitoring the traffic value, and if TR is greater than TRO, TMS node transmits the command signal to change the priority table to each of the control nodes in step S3. Each control node 20, 30, and 40 changes its priority table from Type I to Type II (priority table 22, 32, and 42), which attaches importance to safety, after receipt of the command signal. In step S4, the TMS node continues to monitor the traffic value TR on the transmission path, and determines whether the value TR is smaller than the predetermined value TRO in step S5. If TR is greater than TRO, TMS node continues monitoring the traffic value, and if TR is less than TRO, TMS node transmits the command signal to change the priority table to each control nodes in step S6. Each control node then changes the priority table from Type II to Type I (priority table 21, 31, and 41), which attaches importance to high response, after receipt of the command signal. FIG. 5(b) shows detecting procedure, carried out by the TMS node, for detecting a traffic value on the transmission path. The traffic value can be detected by counting the total time the frames exist on the transmission path in a predetermined time period. In the present invention, the traffic value is detected by counting the number of ID codes in a predetermined timer period. In step S20, timer T and counter CO are set to "0". In step S21, the existence of an ID code on the transmission path is detected. If the ID code is detected, the counter CO is counted up (CO=CO+1) in step S22. If ID code is not detected, then the flow returns to step S21. In step S23, it is judged whether time counted by timer T is equal to a predetermined time (TO) or not. If the time is equal to the predetermined time, traffic value TR is set to CO. If it is not equal, then the flow returns to step S21. Thus, in accordance with the foregoing embodiment, the present invention has the following advantage.

Reliable transmission of both nodes related to high response and safety are transmitted prior to the other nodes when the traffic on the transmission path is crowded, and on the other hand, the nodes which attach importance to high response are transmitted prior to the other nodes when the traffic on the transmission path is not crowded This means that a multiplex transmission system which reconciles high response and safety without making any change in hardware is provided.

FIG. 6 shows the concept for determining the priority of each of the control nodes. In FIG. 6(a), priority for the control nodes which attach importance to high response (type I) is determined. First, the response demand for the control node is classified into three ranks as high, medium, and low ranks. Second, higher priority is given to the high rank node rather than that of the medium or low rank nodes. In a same response rank, highest priority is given to the highest level of safety needs. In FIG. 6(b), priority for the control nodes which attach importance to safety (type II) is determined. First, the safety demand for the control node is classified into three ranks as high, medium, and low ranks. Second, higher priority is given to the high rank node. In a same safety rank, highest priority is given to the highest level of response needs.

Figure 7:
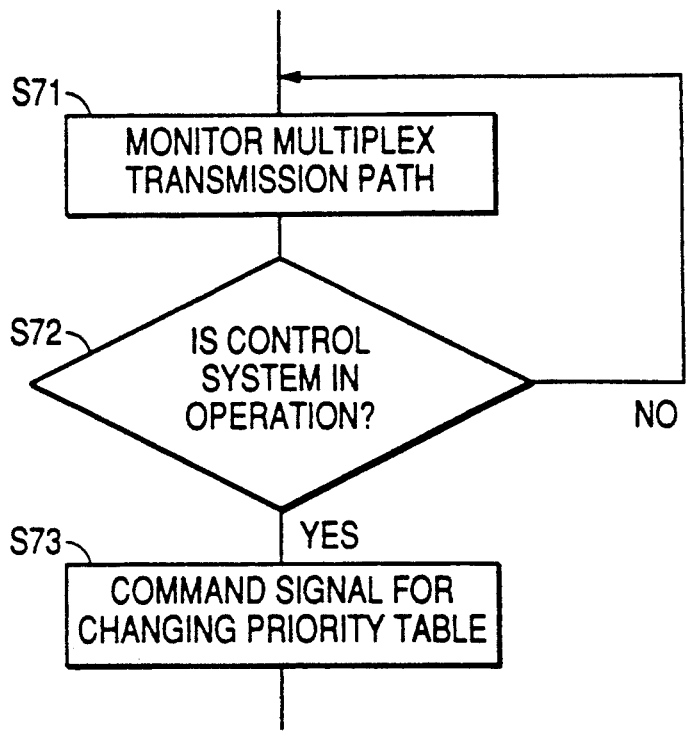
FIG. 7 is a flowchart illustrating the control procedure of a TMS node according to a second embodiment of the invention.

FIG. 7 shows a second embodiment of the invention. In this embodiment, instead of detecting the traffic value on the transmission path directly, the operation of the system controlled by control node B and C is judged. The signal of whether operation of the system is actually carried out is transmitted from control node to TMS node. If the system is in operation (i.e. a signal is generated relating to nodes B or C), the priority table of Type II is selected as described above. If the system is not in operation (i.e. no signals are generated relating to nodes B or C), the priority table of Type I is selected, see steps S71, S72, and S73.

Figure 8A:
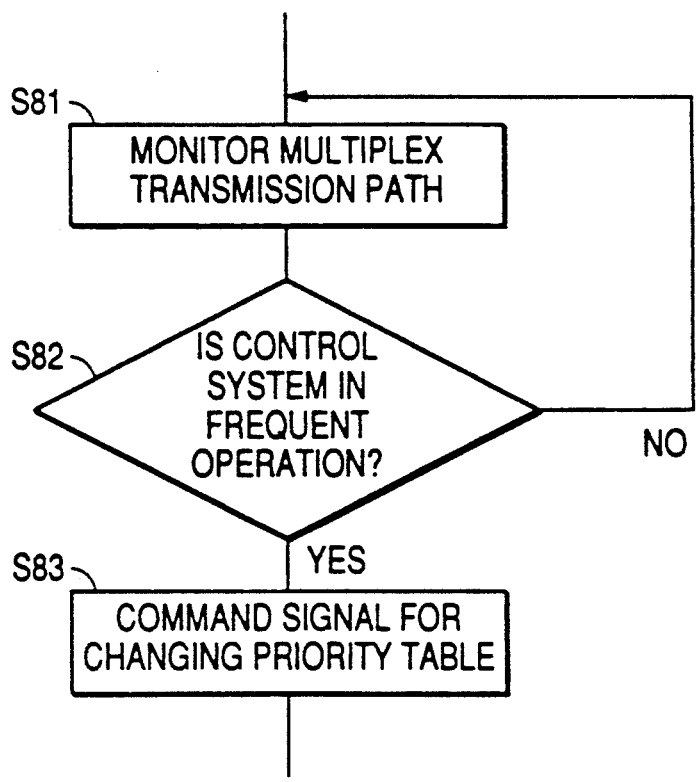
FIGS. 8(a) and 8(b) are flowcharts illustrating the control procedure of a TMS node according to a third embodiment of the invention.
Figure 8B:
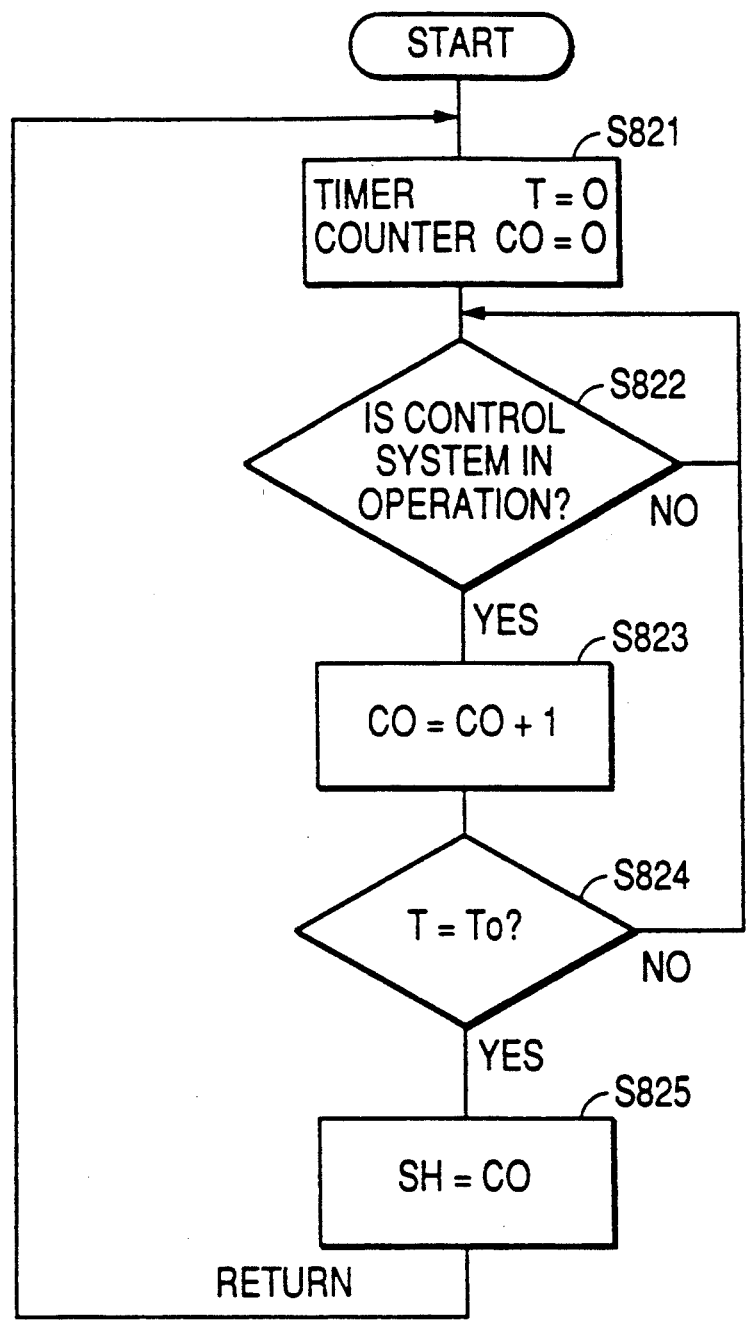

FIGS. 8(a) and (b) show a third embodiment of the present invention. In this embodiment, instead of detecting the traffic value on the transmission path directly, the judgement of whether the system controlled by the control nodes B and C is in frequent operation or not is done. As in the second embodiment, the signal of whether operation of the system (detecting signals from nodes B and C) is actually carried out is transmitted from control node to the TMS node. As shown in FIG. 8(a), said TMS node judges whether the number of said signals in a predetermined period is greater than a predetermined number or not. FIG. 8(b) shows the detecting procedure, carried out by the TMS node, for judging whether the number of said signal in a predetermined time period is greater than a predetermined number or not.

In step S821, timer T and counter CO are set to "0". In step S822, existence of the signal on the transmission path is detected (i.e. is the number of signals in the time period greater than a predetermined number).

If the signal is detected, the counter CO is counted up (CO=CO+1) in step S823. If the signal is not detected, then the flow goes back to step S822. In step S824, it is judged whether time counted by timer T is equal to predetermined time (TO) or not. If the time is equal to the predetermined time, the frequency of operation on the control relating to safety (SH) is set to CO. If it is not equal, then the flow goes back to step S822.

If it is determined that the number of signals on the transmission path for a predetermined time is greater than the predetermined number, the priority table of Type II is selected as described above. If it is not greater than the predetermined number, the priority table of Type I is selected. Thus, in accordance with the foregoing embodiments, the present invention has the following advantage. Proper control is achieved for both high response and safety control and these can be reconciled by selecting proper priority in accordance with the traffic condition of multiplex transmission path.

What is claimed is:

1. A multiplex transmission system for a vehicle comprising:
   a multiplex transmission path;
   a plurality of multiplex nodes, said multiplex nodes being connected to said multiplex transmission path, the multiplex nodes being capable of sending and receiving respective electrical signals containing information of each respective multiplex node to and from said multiplex transmission path, each of said electrical signals including a portion indicating a priority of said electrical signal, said multiplex nodes including means for giving said portion of said electrical signals a plurality of priorities and means for determining the priority of said electrical signals in a predetermined manner such that a signal with higher priority is sent prior to a signal with lower priority when said multiplex nodes are sending respective electrical signals at the same time;

a control node operatively connected to said multiplex transmission path, said control node including a detecting means for detecting a traffic condition on the multiplex transmission path; and priority changing means operatively connected to said multiplex nodes for changing the priority of said portion of said electrical signals sent by at least one of the multiplex nodes in response to the traffic condition detected by the detecting means.

2. The system according to claim 1, wherein said detecting means detects a traffic value indicative of the traffic condition on the multiplex transmission path, said traffic value indicating the number of signals on said multiplex transmission path.

3. The system according to claim 2, wherein said traffic value is determined by counting a total time of frames, which are units of information, existing on said transmission path in a predetermined time period.

4. The system according to claim 2, wherein said traffic value is determined by counting the number of a particular code included in a frame, which is a unit of information, existing on said transmission path in a predetermined time period.

5. The system according to claim 4, wherein said particular code is a code indicating the beginning of the signal.

6. The system according to claim 2, wherein said multiplex nodes include a first node for controlling a first control system demanding a higher response and a second node for controlling a second control system demanding a lower response.

7. The system according to claim 6, wherein said predetermined manner for determining priority is maintained as long as the traffic value indicative of the traffic condition on said transmission path is below a predetermined number and is changed when the traffic condition on said transmission path exceeds the predetermined number.

8. The system according claim 6, wherein said first control system is an engine control system.

9. The system according claim 8, wherein said second control system is a rear wheel steering system.

10. The system according claim 8, wherein said second control system is a anti-lock braking system.

11. The system according to claim 1, wherein said traffic condition is determined by detecting operation of at least one of said multiplex nodes.

12. The system according to claim 1, wherein said traffic condition is determined by detecting frequent operation of at least one of said multiplex nodes.

13. The system according to claim 1, wherein said priority changing means switches the priority of signals between a first order and a second order so that said nodes having a higher priority based on said first order have a lower priority based on said second order.

14. The system according to claim 1, wherein said priority changing means switches the priority of signals based on the traffic condition which senses a signal from one of said multiplex nodes.

15. The system according to claim 14, wherein said priority changing means switches the priority of signals based on the traffic condition which senses a predetermined number of signals from said one of said multiplex nodes.

16. The system according to claim 1, wherein said plurality of priorities include at least two priorities, one of which is based on high response and the other of which is based on safety.

17. A multiplex transmission system for a vehicle comprising:

a multiplex transmission path;

a plurality of multiplex nodes, said multiplex nodes being connected to said multiplex transmission path, the multiplex nodes being capable of sending and receiving respective electrical signals containing information of each respective multiplex node to and from said multiplex transmission path, each of said electrical signals including a portion indicating a priority of said electrical signal, said multiplex nodes including means for giving said portion of said electrical signals a plurality of priorities, means for storing said plurality of priorities and means for determining the priority of said electrical signals in a predetermined manner such that a signal with higher priority is sent prior to a signal with lower priority when said multiplex nodes are sending respective electrical signals at the same time;

a control node operatively connected to said multiplex transmission path, said control node including a detecting means for detecting a traffic condition on the multiplex transmission path; and priority changing means operatively connected to said multiplex nodes for changing the priority of said portion of said electrical signals sent by at least one of the multiplex nodes in response to the traffic condition detected by the detecting means.

18. A multiplex transmission system for a vehicle comprising:

a multiplex transmission path;

a plurality of multiplex nodes, said multiplex nodes being connected to said multiplex transmission path, the multiplex nodes being capable of sending and receiving respective electrical signals containing information of each respective multiplex node to and from said multiplex transmission path, each of said electrical signals including a portion indicating a priority of said electrical signal, said multiplex nodes including means for giving said portion of said electrical signals a plurality of priorities and means for determining the priority of said electrical signals in a predetermined manner such that a signal with higher priority is sent prior to a signal with lower priority when said multiplex nodes are sending respective electrical signals at the same time;

a control node operatively connected to said multiplex transmission path, said control node including a detecting means for detecting a traffic condition on the multiplex transmission path; and priority changing means operatively connected to said multiplex nodes for changing the priority of said portion of said electrical signals sent by at least one of the multiplex nodes in response to the traffic condition detected by the detecting means, said priority changing means switches the priority of signals between a first order and a second order so that said nodes having a higher priority based on said first order have a lower priority based on said second order.

* * * * *